(12) United States Patent
Sato

(10) Patent No.: US 6,866,738 B2
(45) Date of Patent: Mar. 15, 2005

(54) METHOD FOR PRODUCING INTERMEDIATE PRODUCT MADE OF FIBER-REINFORCED COMPOSITE

(75) Inventor: Keiichi Sato, Saitama-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 16 days.

(21) Appl. No.: 09/832,822

(22) Filed: Apr. 12, 2001

(65) Prior Publication Data

US 2001/0030017 A1 Oct. 18, 2001

(30) Foreign Application Priority Data

Apr. 14, 2000 (JP) .................................. 2000-113491

(51) Int. Cl.⁷ ................................................ B31F 1/00
(52) U.S. Cl. ...................... 156/222; 156/199; 156/245; 156/269; 264/258
(58) Field of Search ............................ 156/62.2, 199, 156/222, 243, 245, 224, 264, 267, 311, 307.1; 264/258

(56) References Cited

U.S. PATENT DOCUMENTS 4,269,884 A * 5/1981 DellaVecchia et al. ...... 428/131

5,954,898 A * 9/1999 McKague et al. ............ 156/64

FOREIGN PATENT DOCUMENTS

| EP | 775 561 A1 | 5/1997 | ............ B29B/11/16 |
| EP | 775561 A1 * | 5/1997 | ............ B29B/11/16 |
| JP | 02030518 A * | 1/1990 | ............ B29C/67/14 |

OTHER PUBLICATIONS

English translation of JP 02030518.*
English abstract of JP 02030518.*

* cited by examiner

Primary Examiner—Jeff H. Aftergut
Assistant Examiner—John L. Goff
(74) Attorney, Agent, or Firm—Sughrue Mion, PLLC

(57) ABSTRACT

A method for producing an intermediate product made of a fiber-reinforced composite composed of a reinforcing fiber impregnated with a thermosetting resin or a thermoplastic resin, comprising: (a) the first process where a plurality of sheets made of the fiber-reinforced composite are laminated to each other, heated under a pressure, and cooled under a pressure to provide a flat plate-shaped laminate; (b) the second process where the flat plate-shaped laminate is cut into a plate; and (c) the third process where the plate is softened by heating, placed on a forming tool, and formed by cooling under a pressure.

5 Claims, 4 Drawing Sheets

METHOD FOR PRODUCING INTERMEDIATE PRODUCT MADE OF FIBER-REINFORCED COMPOSITE

BACKGROUND OF THE INVENTION

The present invention relates to a method for producing an intermediate product made of a fiber-reinforced composite.

Stiffened panels made of fiber-reinforced composites (prepregs) are light in weight and high in strength, to have been widely used for automobiles, ships, aircrafts, etc. The stiffened panels are generally produced by placing members for a skin and stiffeners (stringers and frames) each made of a fiber-reinforced composite on a forming tool to prepare an assembly, and by forming the assembly by heating under a pressure while using a pressure bag, etc. To produce a stiffened panel having a reduced weight and improved dimensional and positional accuracy with excellent formability, it is preferred that members composing the stiffeners are preformed to obtain intermediate products beforehand, and the intermediate products are arranged on a skin and then integrated therewith to produce a final product.

Conventionally, the above-mentioned intermediate products have been produced by a method comprising the steps of: cutting fiber-reinforced composites many times to obtain desired lamination structures, respectively; laminating the fiber-reinforced composites on a forming tool to provide a laminate; and forming the laminate. However, this method necessitates complicated works, in particular, lamination of the fiber-reinforced composites on the forming tool is achieved by handwork, thereby requiring much effort.

OBJECT AND SUMMARY OF THE INVENTION

An object of the present invention is to provide a method for easily producing an intermediate product made of a fiber-reinforced composite by reduced number of processes.

As a result of intensive research in view of the above object, the inventor has found that an intermediate product made of a fiber-reinforced composite can be easily produced by reduced processes if a flat plate-shaped laminate of a plurality of fiber-reinforced composite sheets is provided beforehand and appropriately formed. The present invention has been accomplished by the finding.

Thus, a method for producing an intermediate product made of a fiber-reinforced composite according to the present invention comprises: (a) the first process where a plurality of sheets made of the fiber-reinforced composite are laminated to each other, heated under a pressure, and cooled under a pressure to provide a flat plate-shaped laminate; (b) the second process where the flat plate-shaped laminate is cut into a plate; and (c) the third process where the plate is softened by heating, placed on a forming tool, and formed by cooling under a pressure.

In the present invention, the fiber-reinforced composite is composed of a reinforcing fiber impregnated with a thermosetting resin or a thermoplastic resin. In the case where the fiber-reinforced composite is composed of a reinforcing fiber impregnated with a thermosetting resin, the intermediate product is preferably a semi-hardened product having a hardening degree of 1 to 50%. The method of the present invention is suited for producing such a semi-hardened product.

DETAILED DESCRIPTION OF THE PREFERRED EMBODIMENTS

Figure 1:
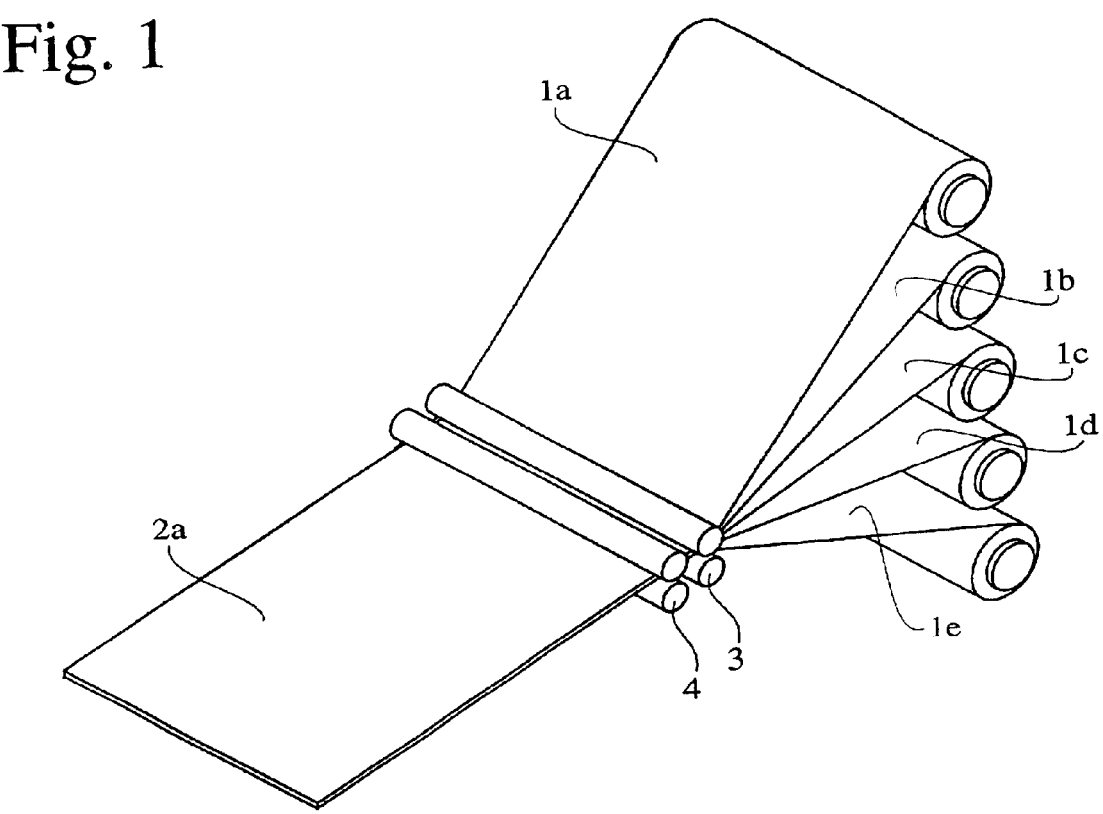
FIG. 1 is a perspective view showing production of a flat plate-shaped laminate used in the present invention.

A method for producing an intermediate product made of a fiber-reinforced composite according to the present invention comprises: (a) the first process where a plurality of sheets made of the fiber-reinforced composite are laminated to each other, heated under a pressure, and cooled under a pressure to provide a flat plate-shaped laminate; (b) the second process where the flat plate-shaped laminate is cut into a plate; and (c) the third process where the plate is softened by heating, placed on a forming tool, and formed by cooling under a pressure.

In the present invention, the fiber-reinforced composite is composed of such a reinforcing fiber as a carbon fiber, a glass fiber, an aramid fiber, etc. impregnated with a thermosetting resin or a thermoplastic resin. The thermosetting resin may be an epoxy resin, a bismaleimide resin, a phenol resin, etc., and the thermoplastic resin may be PEEK, nylon 6, nylon 66, polyethylene terephthalate, etc. Preferred as the thermosetting resin is an epoxy resin, and preferred as the thermoplastic resin is nylon. Ratio of the thermosetting resin or the thermoplastic resin to the reinforcing fiber in the fiber-reinforced composite may be appropriately controlled. Further, size of the fiber-reinforced composite is not particularly limited. The lamination structure of the flat plate-shaped laminate, including the direction of the reinforcing fiber composing each fiber-reinforced composite therein, is also not particularly limited. For example, each fiber-reinforced composite may be laminated in such a direction as (±45°/0°/0°/0°/0 to 90°). Additionally, the number of laminated fiber-reinforced composites may be appropriately selected.

If the fiber-reinforced composite is composed of a reinforcing fiber impregnated with a thermosetting resin, the intermediate product is preferably in a semi-hardened state. In the present invention, "semi-hardened state" means such that the hardening degree of the fiber-reinforced composite is 1 to 80%. In the case where a semi-hardened stringer intermediate product or a semi-hardened frame intermediate product is produced by the method according to the present invention, the intermediate product is preferably a semi-hardened product having a hardening degree of 1 to 50%, to obtain such that can be easily handled and stored and that has properties suitable for integration with the skin. The hardening degree is more preferably 5 to 20%. The method of the present invention is suited for producing such a semi-hardened product. Further, if the fiber-reinforced composite is composed of a reinforcing fiber impregnated with a thermosetting resin, the hardening degree of the flat plate-shaped laminate is equal to or less than that of the intermediate product.

The method of the present invention is essentially the same whether the fiber-reinforced composite contains the thermosetting resin or the thermoplastic resin, so that the explanations for the method will be made below only with respect to the case of the fiber-reinforced composite containing the thermosetting resin.

In the first process, the sheets are preferably heated at 20 to 100° C. under a pressure by a hot press roll, a hot pressing machine, etc. When the heating temperature is more than 100° C., fluidity of the resin in the fiber-reinforced composite is excessively increased. On the other hand, the heating temperature of less than 20° C. invites insufficient stacking of the flat plate-shaped laminate. Further, the pressure is preferably 0.1 to 10 kg/cm². The pressure of more than 10 kg/cm² results in disordered fiber orientation of the fiber-reinforced composite, and the pressure of less than 0.1 kg/cm² invites insufficient stacking of the flat plate-shaped laminate.

In the first process, the sheets are preferably cooled at 10 to 30° C. under a pressure by a cold press roll, a cold pressing machine, etc. When the cooling temperature is more than 30° C., a sheet tends to be peeled off the flat plate-shaped laminate. On the other hand, the cooling temperature of less than 10° C. requires much energy for cooling. Further, the pressure is preferably 0.1 to 10 kg/cm². The pressure of more than 10 kg/cm² results in disordered fiber orientation of the fiber-reinforced composite, and the pressure of less than 0.1 kg/cm² invites insufficient stacking of the flat plate-shaped laminate.

In the second process, the flat plate-shaped laminate may be cut into a plate by a cutting machine having a cutting blade, a water jet, etc. The size of the plate may be properly controlled depending on its use.

In the third process, the plate may be heated and softened by an oven, a heater, etc. The heating temperature is preferably 60 to 100° C., more preferably 70 to 90° C. The plate is heated preferably for 10 to 90 minutes, more preferably for 20 to 50 minutes.

In the third process, the softened plate may be cooled under a pressure by a cold press roll, a cold pressing machine, etc. The cooling temperature is preferably 0 to 50° C., more preferably 20 to 40° C. When the cooling temperature is more than 50° C., the formed product is returned into a plate shape by insufficient cooling. On the other hand, when the cooling temperature is less than 0° C., fluidity of the resin in the fiber-reinforced composite is reduced too much before forming, resulting in insufficient forming. Further, the pressure is preferably 0.1 to 10 kg/cm². The pressure of more than 10 kg/cm² results in disordered fiber orientation of the fiber-reinforced composite, and the pressure of less than 0.1 kg/cm² invites insufficient forming.

In the third process, the forming tool may be made of a steel, aluminum, etc.

Figure 6:
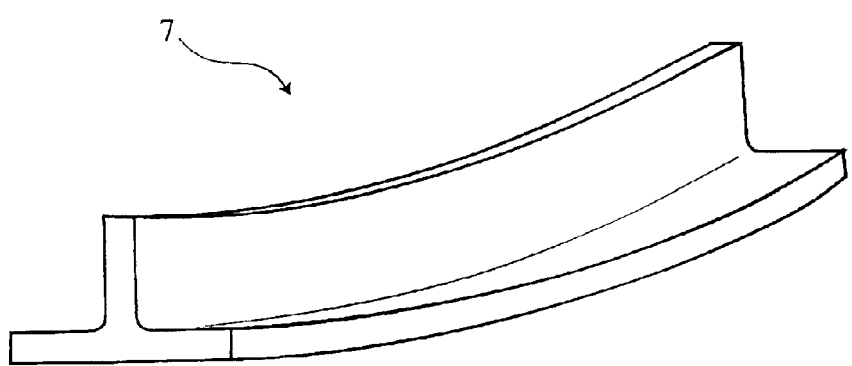
FIG. 6 is a perspective view showing an example of intermediate products produced by the method according to the present invention.

The intermediate products having such various shapes as C-shape, I-shape, T-shape, etc. can be produced by the method according to the present invention. Further, the method of the present invention is suitable for production of the curved-shaped intermediate products. Production of the T-shaped intermediate product 7 shown in FIG. 6 by the method according to the present invention will be described below referring to FIGS. 1 to 5 without intention of restricting the scope of the present invention.

(a) First Process

FIG. 1 shows production of a flat plate-shaped laminate 2a, where five sheets 1a to 1e each made of a fiber-reinforced composite are laminated to each other, heated under a pressure by a hot press roll 3, and cooled under a pressure by a cold press roll 4, automatically. The first process can be carried out automatically, so that the flat plate-shaped laminate can be remarkably easily provided.

(b) Second Process

Figure 2:
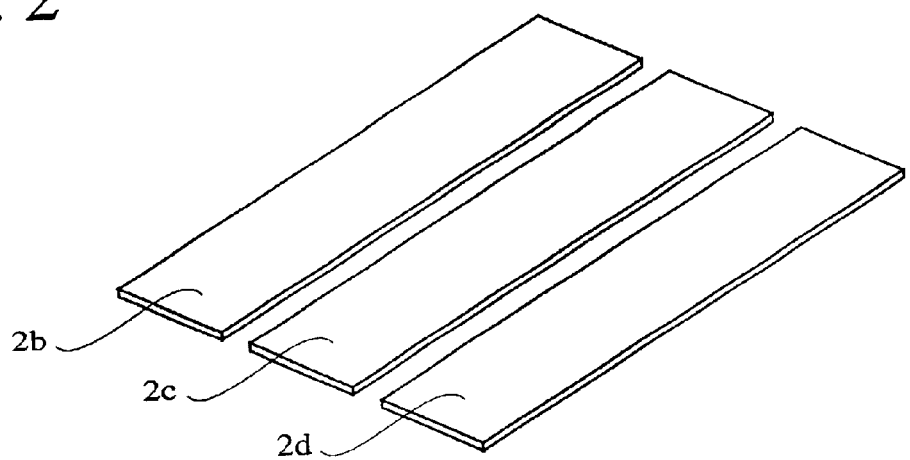
FIG. 2 is a perspective view showing flat plates obtained by cutting the flat plate-shaped laminate shown in FIG. 1.
Figure 3:
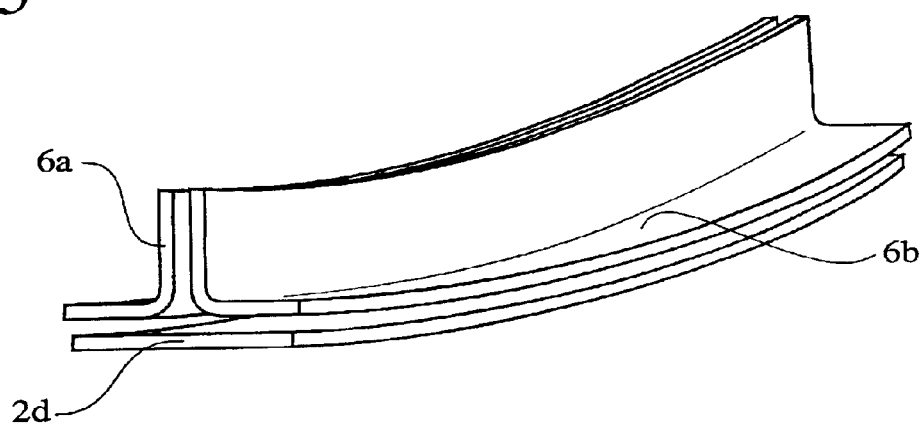
FIG. 3 is a perspective view showing a flat plate and L-shaped plates formed from the flat plates shown in FIG. 2.
Figure 4:
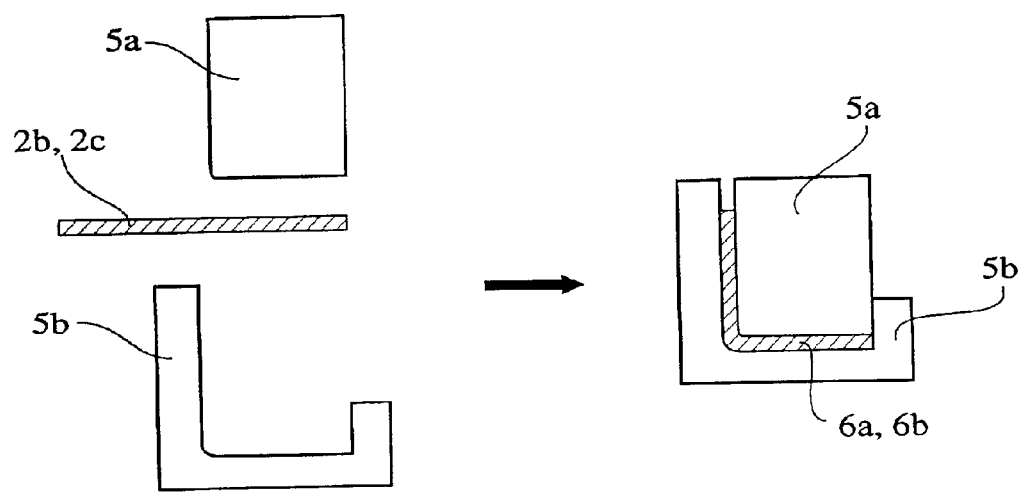
FIG. 4 is a side view showing formation of the L-shaped plates shown in FIG. 3.
Figure 5:
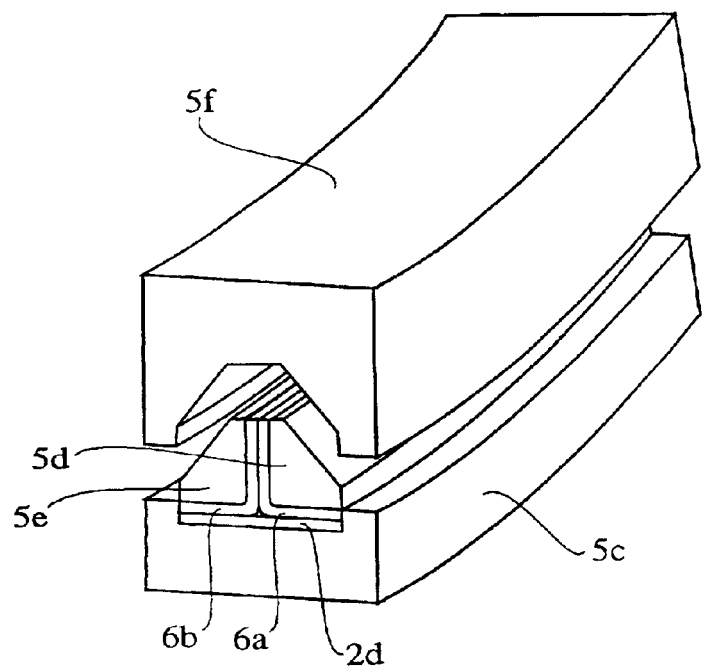
FIG. 5 is a perspective view showing formation of a T-shaped intermediate product from the flat plate and the L-shaped plates shown in FIG. 3.

Flat plates 2b, 2c and 2d shown in FIG. 2 is obtained by cutting the flat plate-shaped laminate 2a in a predetermined size. In the conventional methods, the fiber-reinforced composites are cut many times and laminated on a forming tool. As compared with this, the above-mentioned flat plate-shaped laminate 2a is cut and formed in the present invention, so that the number of the cutting processes is reduced to [1/lamination number of fiber-reinforced composites].

(c) Third Process

In general, the T-shaped intermediate product is produced by two forming steps. The flat plates 2b and 2c are softened by heating and formed by cooling under a pressure, to prepare L-shaped plates 6a and 6b shown in FIG. 3, respectively. The L-shaped plates 6a and 6b having the same shape can be formed from the flat plates 2b and 2c by simple forming tools 5a and 5b shown in FIG. 4. Then, the flat plate 2d is softened by heating, placed on a forming tool 5c shown in FIG. 5 together with the L-shaped plates 6a and 6b. The plates 2d, 6a and 6b are mounted forming tools 5d to 5f on, and formed by cooling under a pressure to produce the T-shaped intermediate product 7 shown in FIG. 6. In this embodiment, because the plates 2d, 6a and 6b have the same lamination structure, needed is only one flat plate-shaped laminate 2a, thereby reducing the number of the laminating processes. The intermediate products having such a simple shape as C-shape, etc. can be produced by one forming step.

Figure 7:
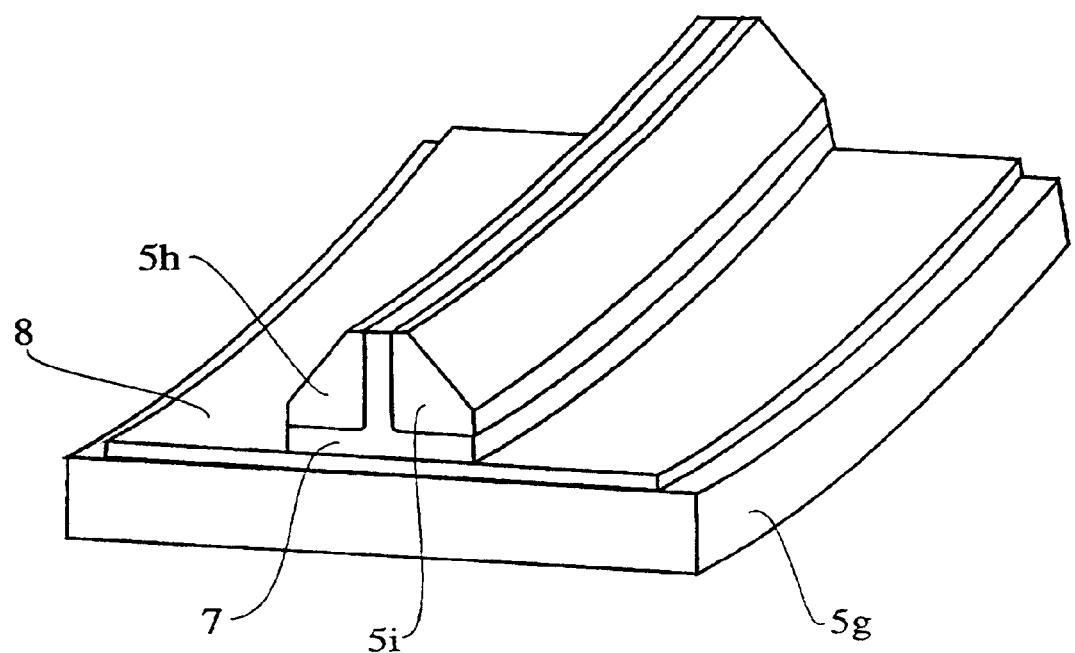
FIG. 7 is a perspective view showing production of a final product where the intermediate product shown in FIG. 6 is integrated with a skin.

The T-shaped intermediate product 7 may be heated under a pressure by a hot pressing machine, an autoclave, etc., integrated with the skin, etc., and completely hardened to produce a final product. For example, as shown in FIG. 7, the T-shaped intermediate product 7 is placed on a skin 8 spread on a forming tool 5g, and integrally formed while mounting forming tools 5h and 5i thereon. A semi-hardened intermediate product obtained by the method according to the present invention may be stored at approximately −20° C. to room temperature, although it may be completely hardened to produce a final product immediately after formation thereof.

As described in detail above, according to a method of present invention, an intermediate product made of a fiber-reinforced composite can be easily produced by reduced processes without complicated works.

What is claimed is:

1. A method for producing an intermediate product made of a fiber-reinforced composite composed of a reinforcing fiber impregnated with a thermosetting resin, comprising: (a) a first-step where a plurality of sheets made of said fiber-reinforced composite are laminated to each other, heated under a pressure by a hot press roll, and cooled under a pressure by a cold press roll to provide automatically a flat board-shaped laminate; (b) a second step where said flat board-shaped laminate is cut into a board; and (c) a third step where said board is softened by heating, placed on a forming tool, and formed by cooling under a pressure, wherein in said first step (a) said plurality of sheets made of said fiber-reinforced composite are heated at a temperature of 20–100° C. under 0.1 to 10 kg/cm², and cooled at a temperature of 10–30° C. under 0.1 to 10 kg/cm² so as to avoid the generation of disordered fiber orientation of the fiber reinforced composite and the formation of insufficient stacking of the flat board-shaped laminate; and in said third step (c) said board is softened by heating at a temperature of 60–100° C. for 10–90 minutes placed on a forming tool, and formed by cooling at a temperature of 0–50° C. under a pressure of 0.1–10 kg/cm² so as to avoid the generation of disordered fiber orientation of the fiber reinforced composite and the occurrence of insufficient forming of said intermediate product and wherein said intermediate product is a semi-hardened product having a hardening degree of 1 to 80%, said fiber-reinforced composite being composed of a reinforcing fiber impregnated with a thermosetting resin.

2. A method for producing an intermediate product made of a fiber-reinforced composite composed of a reinforcing fiber impregnated with a thermosetting resin, comprising:

a) a first step where a plurality of sheets made of said fiber-reinforced composite are laminated to each other, heated under a pressure by a hot press roll, and cooled under a pressure by a cold press roll to provide automatically a flat board-shaped laminate; (b) a second step where said flat board-shaped laminate is cut into a board; and (c) a third step where said board is softened by heating, placed on a forming tool, and formed by cooling under a pressure, wherein in said first step (a) said plurality of sheets made of said fiber-reinforced composite are heated at a temperature of 20–100° C. under 0.1 to 10 kg/cm² and cooled at a temperature of 10–30° C. under 0.1 to 1.0 kg/cm² so as to avoid the generation of disordered fiber orientation of the fiber-reinforced composite and the formation of insufficient stacking of the flat board-shaped laminate; and in said third step (c) said board is softened by heating at a temperature of 60–100° C. for 10–90 minutes placed on a forming tool, and formed by cooling at a temperature of 0–50° C. under a pressure of 0.1–10 kg/cm² so as to avoid the generation of disordered fiber orientation of the fiber-reinforced composite and the occurrence of insufficient forming of said intermediate product, wherein said intermediate product is a T-shaped intermediate product composed of L-shaped board laminates and said flat board-shaped laminate, said L-shaped board laminates and said flat board-shaped laminate being derived from only one flat board-shaped laminate by cutting into a plurality of boards, and wherein said intermediate product is a semi-hardened product having a hardening degree of 1 to 50%.

3. A method for producing an intermediate product made of a fiber-reinforced composite composed of a reinforcing fiber impregnated with a thermosetting resin according to claim 2, wherein said intermediate product is a semi-hardened product having a hardening degree of 5 to 20%.

4. A method for producing an intermediate product according to claim 1, wherein in said third step (c) said board is softened by heating at a temperature of 70–90° C. for 10–90 minutes placed on a forming tool.

5. A method for producing an intermediate product according to claim 2, wherein in said third step (c) said board is softened by heating at a temperature of 70–90° C. for 10–90 minutes placed on a forming tool.

* * * * *